United States Patent
Suzuki

(10) Patent No.: US 8,254,703 B2
(45) Date of Patent: Aug. 28, 2012

(54) IMAGE COMPRESSION APPARATUS AND IMAGE COMPRESSION METHOD

(75) Inventor: Takayuki Suzuki, Machida (JP)

(73) Assignee: Konica Minolta Business Technologies, Inc. (JP)

(*) Notice: Subject to any disclaimer, the term of this patent is extended or adjusted under 35 U.S.C. 154(b) by 864 days.

(21) Appl. No.: 12/372,643

(22) Filed: Feb. 17, 2009

(65) Prior Publication Data

US 2009/0214127 A1  Aug. 27, 2009

(30) Foreign Application Priority Data

Feb. 27, 2008 (JP) ................................ 2008-045871

(51) Int. Cl.
  *G06K 9/36* (2006.01)

(52) U.S. Cl. ........................................ 382/232

(58) Field of Classification Search .................. 382/164, 382/168–171, 232, 237, 254, 274; 358/520, 358/453, 462–464
See application file for complete search history.

(56) References Cited

U.S. PATENT DOCUMENTS

| 5,742,704 | A  | * | 4/1998 | Suzuki et al. | 382/176 |
| 5,940,530 | A  | * | 8/1999 | Fukushima et al. | 382/164 |
| 7,783,126 | B2 | * | 8/2010 | Yamashita et al. | 382/274 |

FOREIGN PATENT DOCUMENTS

JP    10-066072    3/1998

* cited by examiner

*Primary Examiner* — Jose Couso

(74) *Attorney, Agent, or Firm* — Squire Sanders (US) LLP

(57) ABSTRACT

An image compression apparatus includes: a dividing section for dividing an image to be compressed into blocks; a discrimination section for determining whether the divided block is a first kind block, in which an outline portion of the image is not included and a difference between the maximum gradation value and the minimum gradation value of the block is equal to or greater than a reference value; and a normalization output section which divides a distribution range of gradation values depending on the discrimination result with respect to the block and outputs compressed data containing code data for showing to which area in the divided distribution rage, each pixel in each block belongs, the maximum value and the minimum value; wherein the normalization output section arranges the maximum value and the minimum value related to the block in a different order depending on whether the first kind block or not.

10 Claims, 7 Drawing Sheets

FIG. 3

|   |   |   |
|---|---|---|
| A | B | C |
| D | Q | E |
| F | G | H |

$Dif\_A = |Q-A|$ $Dif\_B = |Q-B|$ $Dif\_C = |Q-C|$ $Dif\_D = |Q-D|$ $Dif\_E = |Q-E|$ $Dif\_F = |Q-F|$ $Dif\_G = |Q-G|$ $Dif\_H = |Q-H|$

FIG. 4

DATA OF IMAGE A AT THE TIME COMPRESSION

ORIGINAL IMAGE DATA OF IMAGE A

| 80 | 70 | 7A | 90 |
|---|---|---|---|
| 60 | 74 | 8E | 68 |
| 71 | 8C | 6B | 65 |
| 7A | 66 | 89 | 82 |

MAX: 90
MIN: 60

PIXEL DIFFERENCE

| 20 | 1E | 16 | 28 |
|---|---|---|---|
| 2C | 1A | 29 | 28 |
| 1B | 2C | 23 | 29 |
| 14 | 26 | 24 | 1D |

MAX: 2C

MAX: 90 ——— AREA 0 00
THRESHOLD 1: 84
——— AREA 1 01
THRESHOLD 2: 78
——— AREA 2 10
THRESHOLD 3: 6C
——— AREA 3 11
MIN: 60

NORMALIZED DATA

| 01 | 10 | 01 | 00 |
|---|---|---|---|
| 11 | 10 | 00 | 11 |
| 10 | 00 | 11 | 10 |
| 01 | 11 | 00 | 01 |

MAX: 90
MIN: 60

COMPRESSED DATA OF IMAGE A

| MAXIMUM VALUE 90 | MINIMUM VALUE 60 | PIXEL 1 01 | PIXEL 2 10 | PIXEL 3 01 | PIXEL 4 00 | PIXEL 5 11 | PIXEL 6 10 |

| PIXEL 13 01 | PIXEL 14 11 | PIXEL 15 00 | PIXEL 16 01 |

DATA OF IMAGE A AT THE TIME EXPANSION

NORMALIZED DATA

| 01 | 10 | 01 | 00 |
|---|---|---|---|
| 11 | 10 | 00 | 11 |
| 10 | 00 | 11 | 10 |
| 01 | 11 | 00 | 01 |

MAX: 90
MIN: 60

AREA 0 ——— MAX = REPRESENTATIVE VALUE 1: 90
AREA 1 ——— REPRESENTATIVE VALUE 2: 80
AREA 2 ——— REPRESENTATIVE VALUE 3: 70
AREA 3 ——— MIN = REPRESENTATIVE VALUE 4: 60

DATA AFTER EXPANSION

| 80 | 70 | 80 | 90 |
|---|---|---|---|
| 60 | 70 | 90 | 60 |
| 70 | 90 | 60 | 90 |
| 80 | 60 | 90 | 80 |

FIG. 6

DATA OF IMAGE C AT THE TIME COMPRESSION

ORIGINAL IMAGE DATA

| C0 | A2 | 30 | 2E |
|---|---|---|---|
| C8 | BF | 27 | 42 |
| B2 | AF | 20 | 36 |
| BE | C1 | 2A | 28 |

MAX: C8
MIN: 20

PIXEL DIFFERENCE

| 1E | 7B | 8F | 14 |
|---|---|---|---|
| 26 | 9F | 98 | 22 |
| 16 | 8F | A1 | 16 |
| F | A1 | 97 | E |

MAX: A1

MAX: C8 ——————— AREA 0: 00
THRESHOLD 1: 9E ———
——————— AREA 1: 01
THRESHOLD 2: 74 ———
——————— AREA 2: 10
THRESHOLD 3: 4A ———
——————— AREA 3: 11
MIN: 20

NORMALIZED DATA

| 00 | 00 | 11 | 11 |
|---|---|---|---|
| 00 | 00 | 11 | 11 |
| 00 | 00 | 11 | 11 |
| 00 | 00 | 11 | 11 |

MAX: C8
MIN: 20

COMPRESSED DATA OF IMAGE C

| MAXIMUM VALUE C8 | MINIMUM VALUE 20 | PIXEL 1 00 | PIXEL 2 00 | PIXEL 3 11 | PIXEL 4 11 | PIXEL 5 00 | PIXEL 6 10 | PIXEL 13 00 | PIXEL 14 00 | PIXEL 15 11 | PIXEL 16 11 |
|---|---|---|---|---|---|---|---|---|---|---|---|

DATA OF IMAGE C AT THE TIME EXPANSION

NORMALIZED DATA

| 00 | 00 | 11 | 11 |
|---|---|---|---|
| 00 | 00 | 11 | 11 |
| 00 | 00 | 11 | 11 |
| 00 | 00 | 11 | 11 |

MAX: C8
MIN: 20

AREA 0 ——————— MAX= REPRESENTATIVE VALUE 1: C8
AREA 1 ——————— REPRESENTATIVE VALUE 2: 90
AREA 2 ——————— REPRESENTATIVE VALUE 3: 58
AREA 3 ——————— MIN= REPRESENTATIVE VALUE 4: 20

DATA AFTER EXPANSION

| C8 | C8 | 20 | 20 |
|---|---|---|---|
| C8 | C8 | 20 | 20 |
| C8 | C8 | 20 | 20 |
| C8 | C8 | 20 | 20 |

IMAGE COMPRESSION APPARATUS AND IMAGE COMPRESSION METHOD

RELATED APPLICATION

This application is based on Japanese Patent Application No. 2008-45871 filed on Feb. 27, 2008 in Japanese Patent Office, the entire content of which is hereby incorporated by reference.

BACKGROUND

1. Field of the Invention

The present invention relates to an image compression apparatus, which compresses image data, and particularly relates to an image compression apparatus, which divides an image for compression into a plurality of blocks, and compresses them.

2. Description of Related Art

In an apparatus, such as a digital multi-function peripheral (MFP), in case when saving bit map image data into a memory or a hard disk drive, compression and saving of the image data are performed to reduce a required storage capacity.

One of the compression technologies is a BTC (Block Truncation Coding) compression technology. In BTC compression, the image to be compressed is divided into blocks, each of which has a predetermined number of pixels (for example, 4 pixels×4 pixels). Then, the BTC generates compressed data, which expresses each block with a distribution range (for example, expressed by a maximum value and a minimum value) of the gradation values of a pixel that belongs to the block, and with code data, in which the gradation value of each pixel within the block is normalized (quantized) with the number of gradations smaller than the number of gradations of the original image data in the distribution range.

When expanding the compressed data, a representative value of each value of code data is determined from the distribution range of the gradation that is expressed by the maximum value and the minimum value included in the compressed data. Then, an image is restored by converting each code data included in the compressed data into corresponding image data of the representative value.

For example, in case when performing the BTC compression by converting the image data expressing a pixel with 8 bit-256 gradations into the code data of 2 bit per pixel, the distribution range of the gradation value expressed by the maximum value and the minimum value is expressed by 2 bit-4 gradations in the compressed data. At the time of expansion, the maximum value and the minimum value of the compressed data, and two boundary values that divide the range expressed by these maximum value and minimum value into three are determined as four representative values on each code data. Then, each code data included in the compressed data is restored to a pixel having the representative values corresponding to the value of the code data as the gradation value.

In the BTC compression technology, the distribution range of the gradation in a block is normalized into the number of gradations corresponding to the number of bits of the code data. Therefore, as the distribution range of the gradation value in a block becomes wider, there is a possibility that the error between the original gradation value of the pixel and the gradation value after performing compression and expansion of the original gradation value of the pixel may become large.

Then, for example, Japanese Patent Application Publication No. H10-66072 proposes an image coding apparatus for decreasing degradation of image quality by increasing the number of bits of code data per pixel, and increasing the number of gradation at the time of normalization (quantization) in the case when the distribution range of the gradation in a block is greater than a threshold rather than a case in which the distribution range of the gradation in a block is less than a threshold. In this image coding apparatus, as shown in FIG. 7, image data 101, which has been divided into blocks, is inputted to a compression circuit 100 and has been compressed by both of a first compression circuit 102 and a second compression circuit 103. The number of gradations of each pixel after the compression by the first compression circuit 102 differs from the number of gradations of each pixel after the compression by the second compression circuit 103. The difference between the maximum value and the minimum value in a block is compared with a reference value. Then, it is determined whether to validate an output of the compression circuit 102 or an output of the compression circuit 103 based on a selector signal 104 of the comparison result. In case where difference (distribution range of the gradation value) is greater, the second compression circuit 103 having more gradations is selected when compared with a case where the difference is small.

The compressed data 111 generated by the compression circuit 100 is inputted to an expansion circuit 110. Then, the expansion circuit 110 expands this compressed data 111 with two expansion circuits 112 and 113 respectively based on bit plane information, a mean value and a deviation that are contained in the compressed data. The number of gradations of the first expansion circuit 112 differs from the number of gradations of the second expansion circuit 113. It is determined whether to validate an output of the expansion circuit 112 or an output of the expansion circuit 103 by the selector signal included in the compressed data 111. As described above, the compression in a small bit number is performed in case where the distribution range of the gradation value in a block is narrow, and the compression in a larger bit number is performed in case where the distribution range of the gradation value in a block is wider. Therefore, the image quality degradation is reduced.

Generally, since the gradation of the line itself is uniform, a line and drawing, such as characters have little image quality degradation even if the line and the drawing are normalized and compressed into a small number of gradations (number of bits). However, in the technology disclosed in Japanese Patent Application Publication, in a case where the distribution range of the gradation value in a block is greater than the reference value, the image data is compressed by the second compression circuit 103 having a large number of gradations. Therefore, since the distribution range in a block containing the outline portion of a character written on a white ground is wide, it will be compressed by the second compression circuit 103 having the large number of gradations. Since the character portion occupies the major portion of a usual document, in the above-mentioned compression method, the reduction of the compression ratio becomes a serious problem.

Since a selector signal for expressing the difference of the number of gradations at the time of compression are newly provided, the data volume corresponding to this portion will increase. Further, the reduction of the compression ratio will be caused.

An object of the present invention is to provide an image compression apparatus, which can increase a compression ratio of line drawings, such as a character, while suppressing image quality degradation, to solve the above-mentioned problems.

SUMMARY

According to one aspect of the invention, an image compression apparatus includes: a dividing section for dividing an image to be compressed into blocks, each of which has a predetermined number of pixels having respective gradation value; a maximum value and minimum value search section for obtaining a maximum value and a minimum value of gradation values of the predetermined number of pixels in each block obtained by the dividing section; a discrimination section for determining whether each block of the divided blocks is a first kind block, in which an outline portion of the image is not included and a difference between the maximum value and the minimum value of the block is equal to or greater than a reference value or a second kind block other than the first kind block; and a normalization output section which divides a distribution range of gradation values, both ends of which correspond to the maximum value and the minimum value of each block of the divided blocks, in a case where a discrimination result of the discrimination section with respect to the block is the second kind block, into N areas (where N is an integer which is equal to 2 or greater) and outputs compressed data containing code data for showing to which area in the N areas, each pixel in each block belongs, and the maximum value and the minimum value, and which divides a distribution range of gradation values, both ends of which correspond to the maximum value and the minimum value of each block of the divided blocks, in a case where a discrimination result of the discrimination section with respect to the block is the first kind block, into M areas (where M is an integer which is greater than N) and outputs compressed data containing code data for showing to which area in the M areas, each pixel in each block belongs, the maximum value and the minimum value; wherein in a case of the first kind block, the normalization output section arranges the maximum value and the minimum value related to the block in a first order in a head portion of the compressed data, and in a case of the second kind block, the normalization output section arranges the maximum value and the minimum value related to the block in a second order that is a reverse order of the first order in a head portion of the compressed data.

In the above-mentioned invention, the discrimination section determines whether the block to be processed is the first kind block, which does not contain an outline portion, and in which the difference between the maximum value and the minimum value of the gradation value in the block is equal to or greater than a reference value, or is the second kind block other than this. In the case of the second kind block, the normalization output section normalizes each pixel into N bits (for example, 2 bits), and, in the case of the first kind block, the normalization output section normalizes each pixel into M bit (it is 3 bits which is greater than N). Thereby, in a block (the first kind block) whose distribution range of the gradation value is wider than the reference value and does not contain outline portion, such as a character, each pixel is normalized by a greater number of bits (M bit), and expansion, which suppressed degradation of image quality is attained. On the other hand, each pixel in the block in which the distribution range of the gradation value is narrower than the reference value, and the block (second kind block) containing outline portion of, such as a character although the distribution range of gradation value is wider than the reference value is normalized by N bits which is smaller than M. Although the image of the second kind block is normalized by small number of bits, since the degradation of the image quality is little, it is possible to increase a compression ratio, while preventing degradation of image quality, although the image is normalized by small number of bits.

An arrangement order of the maximum value and the minimum value, which are arranged in the top portion of the compressed data in the first kind block and the second kind block, is made reverse. Therefore, at the time of expansion, the normalization number of bits per pixel (the number of gradation) can be distinguished from this arrangement order. Since it is not necessary to make data volume increase in order to embed this information, reduction of the compression ratio can be prevented.

According to another aspect of the invention, an image compression apparatus includes: a dividing section for dividing an image to be compressed into blocks, each of which has a predetermined number of pixels having respective gradation value; a maximum value and minimum value search section for obtaining a maximum value and a minimum value of gradation values of the predetermined number of pixels in each block obtained by the dividing section; a discrimination section for determining whether each block of the divided blocks is a first kind block, in which an outline portion of the image is not included or a second kind block in which the outline portion of the image is included; and a normalization output section which divides a distribution range of gradation values, both ends of which correspond to the maximum value and the minimum value of each block of the divided blocks, in a case where a discrimination result of the discrimination section with respect to the block is the second kind block, into N areas (where N is an integer which is equal to 2 or greater) and outputs compressed data containing code data for showing to which area in the N areas, each pixel in each block belongs, and the maximum value and the minimum value, and which divides a distribution range of gradation values, both ends of which correspond to the maximum value and the minimum value of each block of the divided blocks, in a case where a discrimination result of the discrimination section with respect to the block is the first kind block, into M areas (where M is an integer which is greater than N) and outputs compressed data containing code data for showing to which area in the M areas, each pixel in each block belongs, the maximum value and the minimum value; wherein in a case of the first kind block, the normalization output section arranges the maximum value and the minimum value related to the block in a first order in a head portion of the compressed data, and in a case of the second kind block, the normalization output section arranges the maximum value and the minimum value related to the block in a second order that is a reverse order of the first order in a head portion of the compressed data.

In the above-mentioned invention, the discrimination section determines whether the block to be processed is the first kind block, which does not contain the outline portion, or the second kind block containing the outline portion. In a case of the second kind block, the normalization output section normalizes each pixel in N bit (for example, 2 bits), and in the case of the first kind block, each pixel is normalized in M bit (for example, 3 bits, which is equal to or greater than N).

According to still other aspect of the invention, an image compression method includes: dividing an image to be compressed into blocks, each of which has a predetermined number of pixels having respective gradation value; obtaining a maximum value and a minimum value of gradation values of the predetermined number of pixels in each block obtained by the dividing section; determining whether each block of the divided blocks is a first kind block, in which an outline portion of the image is not included and a difference between the maximum value and the minimum value of the block is equal to or greater than a reference value or a second kind block other than the first kind block; dividing a distribution range of gradation values, both ends of which correspond to the maximum value and the minimum value of each block of the divided blocks, in a case where a discrimination result of the discrimination section with respect to the block is the second kind block, into N areas (where N is an integer which is equal to 2 or greater) and outputting compressed data containing code data for showing to which area in the N areas, each pixel in each block belongs, and the maximum value and the minimum value; dividing a distribution range of gradation values, both ends of which correspond to the maximum value and the minimum value of each block of the divided blocks, in a case where a discrimination result of the discrimination section with respect to the block is the first kind block, into M areas (where M is an integer which is greater than N) and outputting compressed data containing code data for showing to which area in the M areas, each pixel in each block belongs, the maximum value and the minimum value; and in a case of the first kind block, arranging the maximum value and the minimum value related to the block in a first order in a head portion of the compressed data, and in a case of the second kind block, arranging the maximum value and the minimum value related to the block in a second order that is a reverse order of the first order in a head portion of the compressed data.

According to still other aspect of the invention, an image compression method includes: dividing an image to be compressed into blocks, each of which has a predetermined number of pixels having respective gradation value; obtaining a maximum value and a minimum value of gradation values of the predetermined number of pixels in each block obtained by the dividing section; determining whether each block of the divided blocks is a first kind block, in which an outline portion of the image is not included or a second kind block in which the outline portion of the image is included; dividing a distribution range of gradation values, both ends of which correspond to the maximum value and the minimum value of each block of the divided blocks, in a case where a discrimination result of the discrimination section with respect to the block is the second kind block, into N areas (where N is an integer which is equal to 2 or greater) and outputting compressed data containing code data for showing to which area in the N areas, each pixel in each block belongs, and the maximum value and the minimum value; dividing a distribution range of gradation values, both ends of which correspond to the maximum value and the minimum value of each block of the divided blocks, in a case where a discrimination result of the discrimination section with respect to the block is the first kind block, into M areas (where M is an integer which is greater than N) and outputting compressed data containing code data for showing to which area in the M areas, each pixel in each block belongs, the maximum value and the minimum value; and in a case of the first kind block, arranging the maximum value and the minimum value related to the block in a first order in a head portion of the compressed data, and in a case of the second kind block, arranging the maximum value and the minimum value related to the block in a second order that is a reverse order of the first order in a head portion of the compressed data.

BRIEF DESCRIPTION OF THE DRAWINGS

FIG. 3 illustrates a schematic diagram showing a comparative example of a gradation value of an adjacent pixel in determining whether an outline portion is included or not included.

FIG. 4 illustrates a schematic diagram showing various data in case where compressing or expanding original data of image A in a compression circuit section.

FIG. 6 illustrates a schematic diagram showing various data in case where compressing or expanding original data of image C in a compression circuit section.

DETAILED DESCRIPTION OF THE PREFERRED EMBODIMENTS

Hereafter, an embodiment of the present invention will be described based on drawings.

Figure 1:
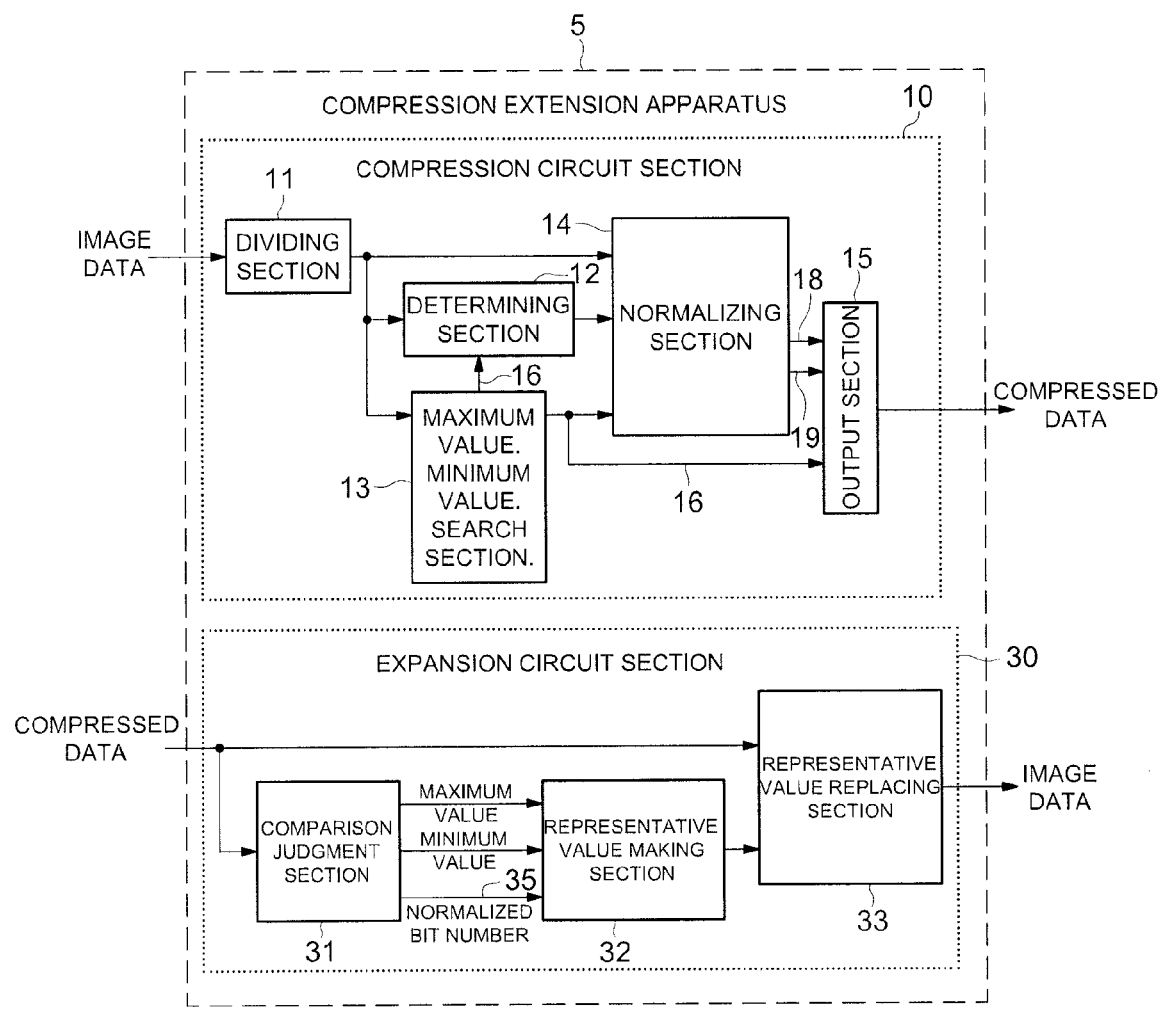
FIG. 1 illustrates a block diagram showing a schematic configuration of a compression expansion apparatus related to an embodiment of the present invention.

FIG. 1 illustrates a configuration of a compression expansion apparatus 5 related to an embodiment of the present invention. The compression expansion apparatus 5 includes a compression circuit section (image compression apparatus) 10 to which image data of image to be compressed is inputted and from which compressed data that this image was divided into blocks for every predetermined number of pixels and compressed for every block, and includes an expansion circuit section 30, which expands the compressed data generated by the compression circuit section 10. As an example in the multi function peripheral that has a copy function and a print function of a document, the compression expansion apparatus 5 is used to expand the compressed data, which was read-out from the hard disk drive at the time of an output after compressing and saving the image data inputted to the hard disk drive.

The compression expansion apparatus 5 is configured by a hardware circuit, such as sequencer and a logic circuit in which a micro program is built-in. The compression expansion apparatus 5 may be realized by executing a predetermined program in computer paraphernalia that includes CPU (Central Processing Unit), ROM (Read Only Memory) and RAM (Random Access Memory).

A compression technology used in the compression circuit section 10 is based on BTC compression. The image data inputted to the compression circuit section 10 is image data of bit map form that expresses one pixel with 256 gradation of 8-bit-deep.

The compression circuit section 10 includes a dividing section 11, a discriminate section 12, a maximum value and minimum value retrieval section 13, a normalization section 14, and an output section 15. A normalization output section is configured by the normalization section 14 and the output section 15.

Figure 2:
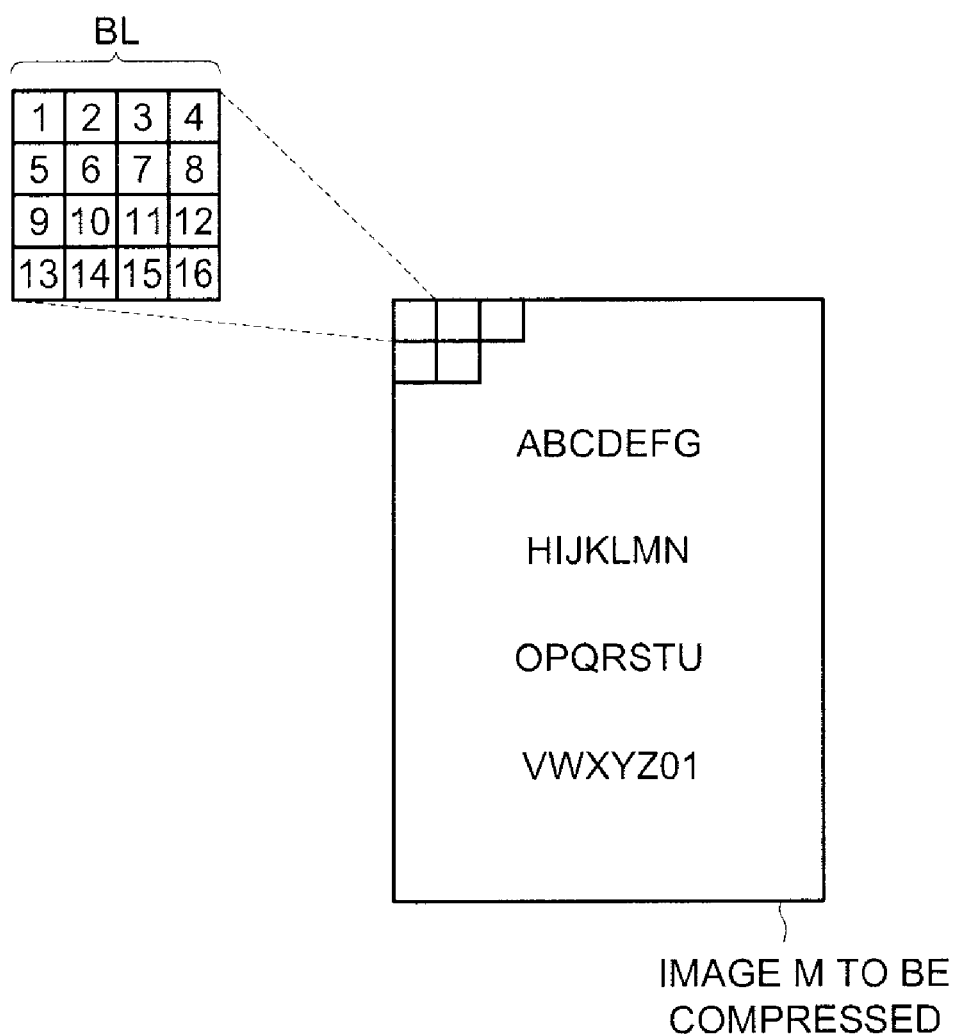
FIG. 2 illustrates a simulative diagram showing a state in which an image for compression is divided into blocks.

The dividing section 11 divides the inputted image data to be compressed into blocks of every predetermined number of pixels. Here, as shown in FIG. 2, the inputted image data to be compressed is divided into blocks (4 pixels×4 pixels) BL by setting a base point at the upper left of an image M. Every time when one block is divided, the dividing section 11 sends out the image data of the block to the discrimination section 12, the maximum value and minimum value retrieval section 13, and the normalization section 14.

For every block acquired from the division in the dividing section 11, the maximum value and minimum value retrieval section 13 performs a function for obtaining the maximum value and the minimum value of the gradation of image pertaining to the block (block to be processed that was inputted from the dividing section 11). For example, the maximum value and the minimum value in the block are retrieved by sequentially comparing the gradation value of each pixel of the block to be processed. The retrieval result 16 is sent to the discrimination section 12, the normalization section 14, and the output section 15.

For every block that was divided and acquired from the dividing section 11, the discrimination section 12 determines whether the block (block to be processed that was inputted from the dividing section 11) is a first kind block, which has the difference of the maximum value and the minimum value (the maximum value and the minimum value that the maximum value and minimum value retrieval section 13 calculated for the block) that pertains to the block is not less than a reference value and which also does not contain the outline section, or a second kind block other than the first kind block. An attribute signal 18, which expresses the discrimination result of the discrimination section 12, is sent to the normalization section 14.

In case when the maximum value of the difference of the gradation value of the pixels adjacent to each other in the block to be processed (this is called a pixel difference) is not more than the default value defined beforehand, the discrimination section 12 determines that the block does not include the outline section. On the other hand, in case when the maximum value of the difference of the gradation value of the pixels adjacent to each other in the block to be processed exceeds the default value, the discrimination section 12 determines that the block includes the outline section.

In detail, as shown in FIG. 3, the differences (Dif_A-Dif_H) between a targeted pixel Q and eight pixels surrounding the targeted pixel Q in the block are taken. Then, the maximum value of the differences becomes a pixel difference of the targeted pixel. The pixel difference related to all the pixels in the block is calculated. In case when the maximum value in the pixel difference is larger than the default value, the block is determined to include the outline section. The discriminating method of whether the outline section is included or not is not limited to this method. For example, in an image processing section of a multi function peripheral, generally, an area distinction of a character area or of a photograph area is performed by a filter processing to each area of the image to be processed. Therefore, this result may be used.

The normalization section 14 performs the following process for every block (block to be processed that was inputted from the dividing section 11) divided and acquired from the dividing section 11. In case when the discrimination result (attribute signal 18) of the discrimination section 12 related to the block to be processed indicates the second kind block, the normalization section 14 divides (here, equally divides into N pieces) a distribution range of the gradation, which has the maximum value and the minimum value retrieved by the maximum value and minimum value retrieval section 13 related to the block on both ends, into N (N is no less than 2, which is a predetermined integer) areas. Then, the normalization section 14 generates code data (normalized data), which shows where each pixel in this block belongs in the N areas. Here, N is set as "4." The number of bits (normalization number of bits) of the code data per pixel is set as two bits, which is the minimum number of bits that four values can be expressed.

In case when the discrimination result (attribute signal 18) of the discrimination section 12 related to the block to be processed indicates the first kind block, the normalization section 14 divides (here, equally divides into M pieces) a distribution range of the gradation, which has the maximum value and the minimum value retrieved by the maximum value and minimum value retrieval section 13 related to the block on both ends, into M (M is a larger predetermined integer than N) areas. Then, the normalization section 14 generates the code data, which shows where each pixel in this block belongs in the M areas. Here, M is set as "8." The number of bits of the code data per pixel is set as three bits, which is the minimum number of bits that eight values can be expressed.

The normalization section 14 assigns the code data in an ascending order from the minimum value ("00" and "000") to each area sequentially from the area where the gradation value is large. For example, in case when the code data is two bits, the area, which has the maximum value and the minimum value on both ends, is divided into four areas. The code data "00" of a binary number is assigned in area 0 where the gradation value is the largest. The code data "01" of a binary number is assigned in area 1 where the gradation value is the next largest. The code data "10" of a binary number is assigned in area 2 where the gradation value is the third largest. The code data "11" of a binary number is assigned in area 3 where the gradation value is the smallest.

In case when the code data is three bits, the area, which has the maximum value and the minimum value on both ends, is divided into eight areas. Then, the code data "000" of a binary number is assigned in area 0 where the gradation value is the largest. The code data "001" of a binary number is assigned in area 1 where the gradation value is the next largest. The code data "010" of a binary number is assigned in area 2 where the gradation value is the second largest. The code data "011" of a binary number is assigned in area 3 where the gradation value is the third largest. The code data "100" of a binary number is assigned in area 4 where the gradation value is the fourth largest. The code data "101" of a binary number is assigned in area 5 where the gradation value is the fifth largest. The code data "110" of a binary number is assigned in area 6 where the gradation value is the sixth largest. The code data "111" of a binary number is assigned in area 7 where the gradation value is the smallest.

The code data are arranged and generated to each pixel in the block BL of FIG. 2 in a certain numerical order. That is, the code data are arranged corresponding to an order of sequentially moving from an upper left pixel in the block towards a right-hand side of the same line. Then, when it reaches to the right end, the order moves to the left end of the line one below and move towards the right-hand side on the same line.

Code data 19 generated by the normalization section 14 is sent to the output section 15 along with the attribute signal 18 pertaining to the block related to these code data.

The output section 15 inputs the retrieval result 16 that shows the maximum value and the minimum value of the gradation value of the block to be processed from the maximum value and minimum value retrieval section 13. Then, the output section 15 inputs the code data 19 and the attribute signal 18 pertaining to the block from the normalization section 14. In case when the attribute signal 18, which is inputted from the normalization section 14, indicates the first kind block, the output section 15 arranges the maximum value and the minimum value related to the block to a header section in a first order. Then, the output section 15 generates and outputs the compressed data in which the code data for each pixel belonging to the block are arranged behind those values. In case when the attribute signal 18, which is inputted from the normalization section 14, indicates the second kind block, the output section 15 arranges the maximum value and the minimum value related to the block to a header section in a second order, which is reverse order of the first order. Then, the output section 15 generates and outputs a compressed data in which the code data for each pixel belonging to the block are arranged behind those values. In either case, the arrangement order of the code data is a numerical order as indicated in the block BL of FIG. 2.

The expansion circuit section 30 has a function of expanding the compressed data, which was outputted from the compression circuit section 10 and inputted to the expansion circuit section 30, into the image data. The expansion circuit section 30 is configured by a comparison judgment section 31, a representative value creating section 32, and a representative value replacing section 33.

The comparison judgment section 31 determines whether the data indicating the gradation value are arranged in the order of the maximum value to the minimum value, or whether the data indicating the gradation value are arranged in the order of the minimum value to the maximum value in the header section of the compressed data pertaining to the inputted block. Then, from the determined result, the comparison judgment section 31 outputs the signal 35, which indicates a normalized bit number of the code data of the compressed data, to the representative value creating section 32.

Here, in case when the data indicating the gradation are arranged in the order of the maximum value to the minimum value, the comparison judgment section 31 outputs the signal 35 that indicates the normalization bit number to be three bits. In case when the data indicating the gradation are arranged in the order of the minimum value to the maximum value, the comparison judgment section 31 outputs the signal 35 that indicates the normalization bit number to be two bits. The comparison judgment section 31 outputs the maximum value and minimum value, which were included in the compressed data to the representative value creating section 32.

The representative value creating section 32 computes a representative value of the gradation value to correspond to each value of the code data from the maximum value and the minimum value, and the signal that indicates the normalization bit number inputted from the comparison judgment section 31. For example, the representative value creating section 32 sets the maximum value, the minimum value and each boundary value of when equally dividing a range between the maximum value and the minimum value into a number of areas, which is 1 less than a number of kinds of information that is capable of being expressed by the number of bit represented by the signal 35 as respective representative values. The representative value is assigned in order of large to small to each value of the code data arranged in an ascending order.

The representative value replacing section 33 converts each code data included in the compressed data into the image data of the representative value corresponding to a value of the code data. The code data included in the compressed data for one block are arranged in the order of the arrangement in the compressed data according to the numerical order in the block BL of FIG. 2. That is, the pixels will be arranged in the order, which starts from the pixel of the upper left in the block to the pixel on the right-hand side in the same line. When the right end is reached, the pixels will be arranged in the order, which starts from a pixel at the left end of one line below to the pixel on the right-hand side. Then, image data for one block will be reproduced. A correspondence relation between the arrangement of the pixel in one block and arrangement in the compressed data of the code data of the pixel is not limited to an order shown in FIG. 2. As long as there is an agreement between the compression circuit section 10 and the expansion circuit section 30, an arbitrary arrangement order may be sufficient.

Figure 5:
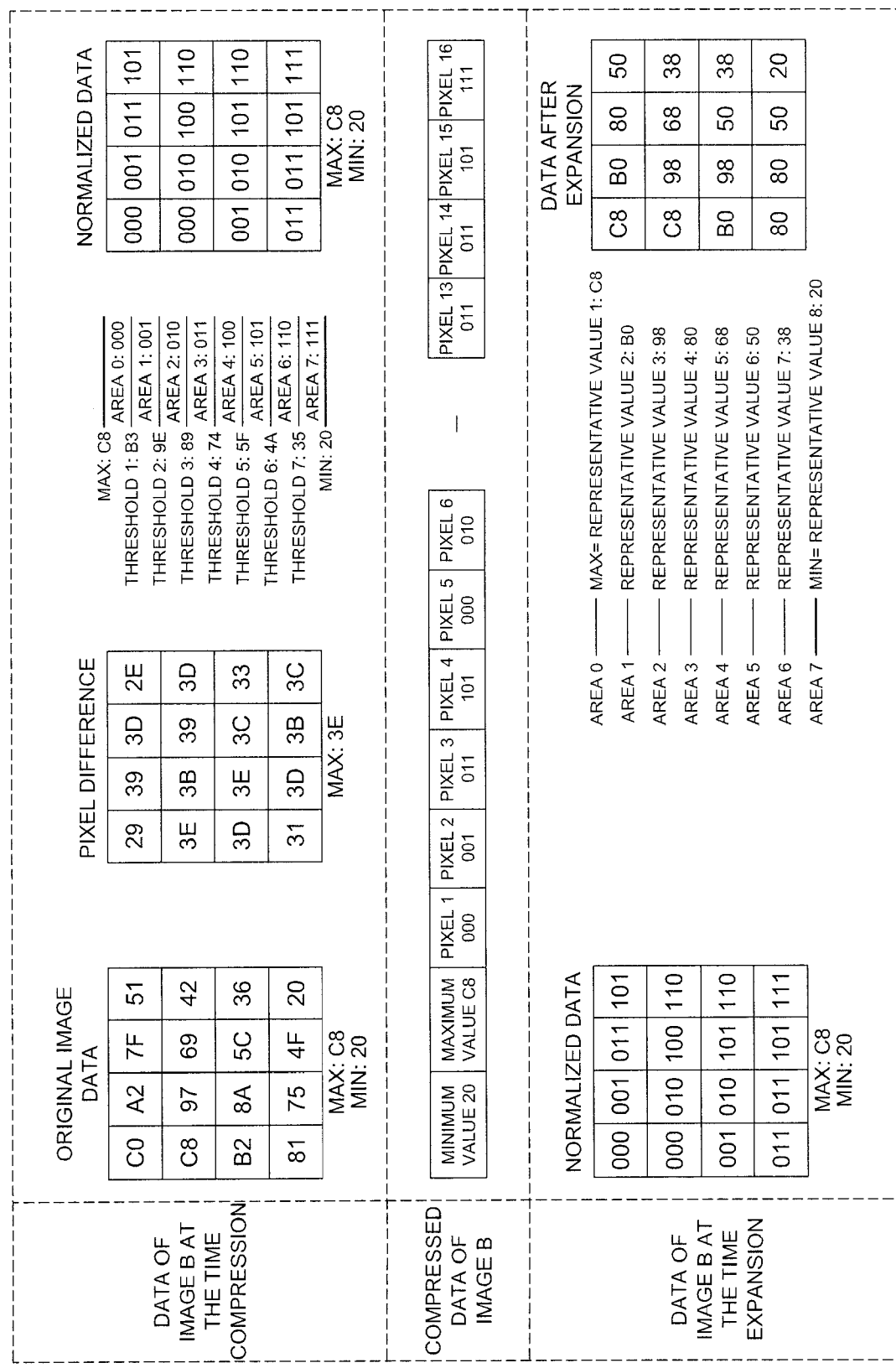
FIG. 5 illustrates a schematic diagram showing various data in case where compressing or expanding original data of image B in a compression circuit section.
Figure 7:
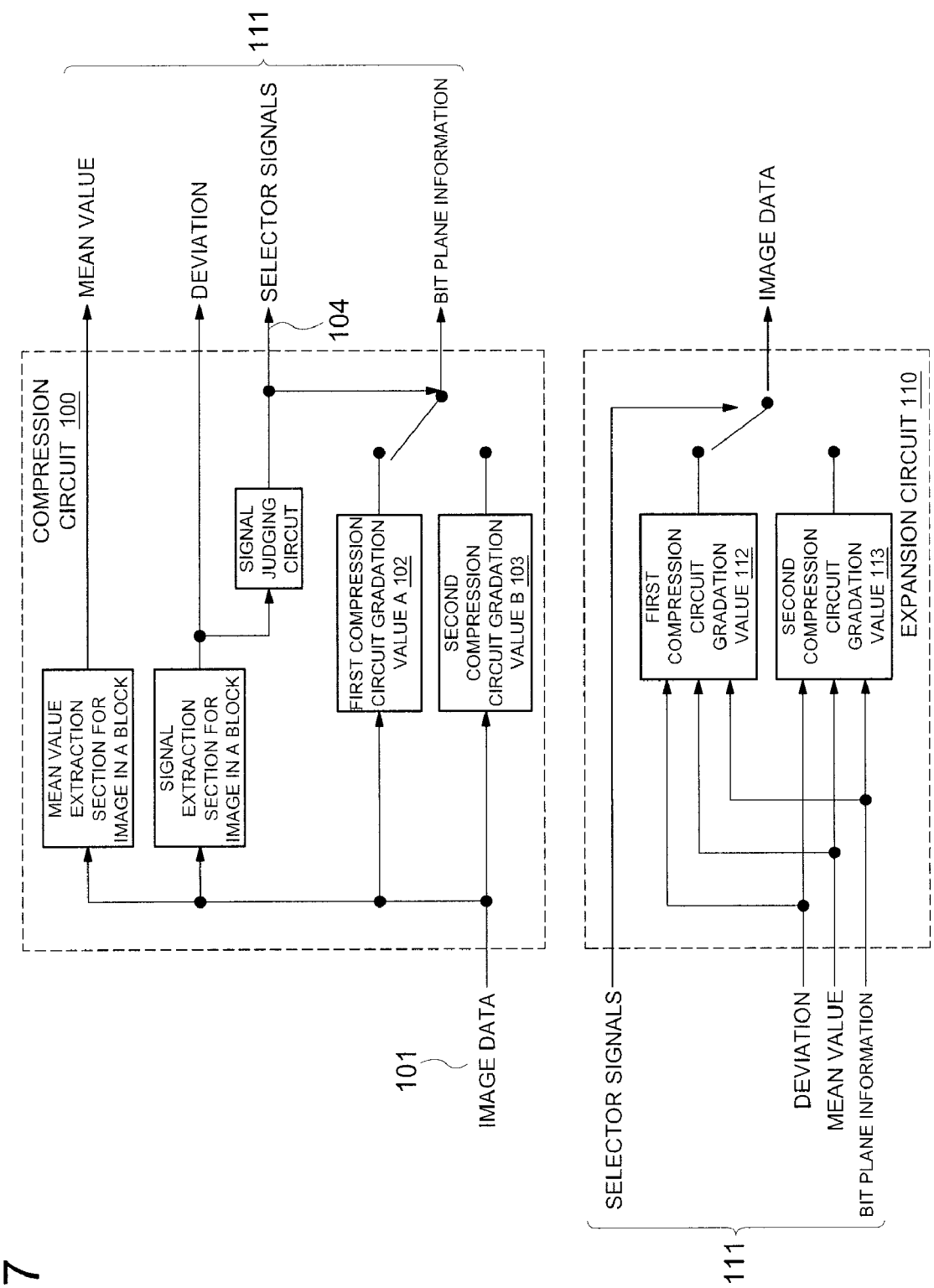
FIG. 7 illustrates a block diagram showing a conventional compression expansion circuit.

Next, an example of a compression expansion by the compression expansion apparatus 5 is shown in from FIG. 4 to FIG. 6. The gradation value is indicated in a hexadecimal number. Here, a reference value compared with the maximum value and the minimum value of the gradation value is 80h (h is a letter indicating the hexadecimal number). Then, a default value used in determining whether the outline section is included or not is 60h.

In case when the difference of the maximum value and the minimum value of the gradation value in the block to be processed is larger than 80h (the reference value), and the maximum value of the difference of the gradation value between adjacent pixels in the block is less than 60h (the default value) (an outline section is not included), the discrimination section 12 of the compression circuit section 10 discriminates the block as the first kind block. In case when the difference of the maximum value and the minimum value of the gradation value in the block is smaller than 80h (the reference value), or in case when the difference of the maximum value and the minimum value of the gradation value in the block is larger than 80h (the reference value) and the maximum value of the difference of the gradation value between adjacent pixels in the block is more than 60h (the default value) (an outline section is included), the discrimination section 12 of the compression circuit section 10 discriminates the block as the second kind block.

When related to the first kind block, the normalization section 14 generates the code data in which each pixel normalized to three bits. When related to the second kind block, the normalization section 14 generates the code data in which each pixel is normalized each to two bits. In case of the first kind block, the output section 15 arranges the maximum value and the minimum value of the gradation value in the block from the header section of the compressed data in the order of the minimum value to the maximum value (the first order). In case of the second kind block, the output section 15 arranges the maximum value and the minimum value of the gradation value in the block from the header section of the compressed data in the order of the maximum value to the minimum value (the second order).

FIG. 4 illustrates various kinds of data in the case of compressing/expanding original image data of an image A by the compression circuit section 10. Since the difference of the maximum value of 90h and the minimum value of 60h of the gradation value in the block is 30h, which is smaller than the reference value of 80h, the original image data of the image A is determined to be the second kind block. As a result, in this block, between the maximum value of 90h and the minimum value of 60h is divided into four areas. Then, the image data indicating the gradation value of each pixel is converted to the code data (normalization data) of two bits corresponding to the area to which the gradation value belongs. The compressed data is configured by being arranged in the order of the maximum value, the minimum value, and the code data of each pixel.

At the time of an expansion, the comparison judgment section 31 compares data of two byte (two bytes from the top) of the header section of the compressed data. Then, the comparison judgment section 31 determines that the data is compressed data (the second kind block) normalized by two bits, because a value of a first byte is larger than a value of a second byte. The comparison judgment section 31 expands the code data by generating the representative value with which the code data is replaced when restoring each code data (the normalization data) and by having the value of the first byte as the maximum value and the value of the second byte as the minimum value, and by dividing between the maximum value and the minimum value into three.

FIG. 5 illustrates various kinds of data in the case of compressing/expanding the original image data of an image B by compression circuit section 10. Since the difference of the maximum value of C8h and the minimum value of 20h of the gradation value in the block is A8h, which is larger than the reference value of 80h, and the maximum value of the pixel difference is 3Eh, which is smaller than the default value of 60h, the original image data of the image B is determined to be the first kind block. As a result, in this block, between the maximum value of C8h and the minimum value of 20h is divided into eight areas. Then, the image data indicating the gradation value of each pixel is converted into the code data (normalization data) of three bits corresponding to the areas to which the gradation values belong. The compressed data is configured by being arranged in the order of the maximum value, the minimum value and the code data of each pixel.

At the time of an expansion, the comparison judgment section 31 expands the code data by comparing data of the first two byte of the compressed data and determining that the data is compressed data (the first kind block) normalized by three bits, because the value of the first byte is smaller than the value of the second byte.

FIG. 6 illustrates various kinds of data in the case of compressing/expanding the original image data of an image C by the compression circuit section 10. Since the difference of the maximum value of C8h and the minimum value of 20h of the gradation values in the block is A8h, which is larger than the reference value of 80h, and the maximum value of the pixel difference is A1h, which is larger than the default value of 60h, the original image data of the image C is determined to be the second kind block. As a result, in this block, between the maximum value of C8h and the minimum value of 20h is divided into four areas. Then, the image data indicating the gradation value of each pixel is converted into the code data (normalization data) of two bits corresponding to the areas to which the gradation values belong. The compressed data is configured by being arranged in the order of the maximum value, the minimum value and the code data of each pixel.

At the time of an expansion, the comparison judgment section 31 performs expansion by comparing data of the first two byte of the compressed data and determining that the data is the compressed data normalized (the second kind block) by two bits, because the value of the first byte is larger than the value of the second byte.

Thus, since each block is compressed according to a characteristic of the image, image quality degradation can be reduced and a compression ratio to line drawings, such as a character, can be improved. That is, since the distribution range of the gradation value is wider than the reference value, and the block (first kind block), which does not include the outline section, such as characters, is normalized with many numbers of bits (M bit), the expansion, which suppresses image quality degradation, is attained. On the other hand, the image of the block whose distribution range of the gradation value is narrower than the reference value, and the image of the block (second kind block) whose distribution range of the gradation value is wider than the reference value, but includes outline section, such as a character, since the image quality degradation is little when normalized with a small number of bits, a compression ratio can be raised while preventing degradation of image quality even when normalized to N bits that is smaller than M.

Information, which indicates to what bit each pixel is normalized at the time of compression, namely, information for discerning whether it is the compressed data of the first kind block using the code data of two bits of each pixel, or whether it is the compressed data of the second kind block using the code data of three bits of each pixel, is expressed by whether the order of the maximum value and the minimum value originally included in the compressed data is in an order of the maximum value to the minimum value, or in an order of the minimum value to the maximum value. Therefore, the data volume for embedding the information does not need to be increased, and a decline of the compression ratio can be prevented.

As mentioned above, an embodiment of the present invention was described with the drawings. However, a concrete configuration is not limited to what was shown in the embodiment. Even when there are changes and addition, which does not depart from the scope of the present invention, it is included in the present invention.

For example, in an embodiment of the present invention, the discrimination section 12 is arranged to determine the block as the first kind block in case when the outline section is not included and the difference of the maximum value and the minimum value pertaining to the block is more than the reference value, and determines the blocks other than the first kind block to be the second kind block. However, the discrimination section 12 may be arranged to determine without including a condition of comparing the reference value and the difference of the maximum value and the minimum value. That is, the discrimination section 12 may be configured to determine a block as the first kind block in case when the outline section is not included, and to determine a block as the second kind block in case when the outline section is included. Since the difference of the adjacent pixels is beyond the default value in case when outline section is included, the difference of the maximum value and the minimum value of the gradation value in the block becomes at least more than the default value. Therefore, even when the discrimination section 12 determines the block as the first kind block or the second kind block only by whether the outline section is included or not, a similar discrimination result can be obtained when performing the determination including the comparison to the reference value.

In the embodiment, in case of the first kind block, data are arranged in the order of from the minimum value to the maximum value in the header section of the compressed data, and, in case of the second kind block, data are arranged in the order of from the maximum value to the minimum value. However, the order can be reverse of the above-mentioned order. It is fine as long as there is an agreement of the order between the compression circuit section 10 and the expansion circuit section 30.

A case where the coding data was two bits and a case where the coding data was three bits were illustrated as examples. However, it is not limited to two bits and three bits. Arbitrary two kinds of numbers of bit selected within arbitrary numbers of bits smaller than the number of bit of one pixel of the original image data will be acceptable.

In addition, the reference value or the default value is not limited to the value illustrated in the embodiment, but can be arbitrarily set as a proper value. A default value and a defined value may be configured to be able to change setting. The size of one block is not limited to the size illustrated by the embodiment.

What is claimed is:

1. An image compression apparatus comprising:
a dividing section for dividing an image to be compressed into blocks, each of which has a predetermined number of pixels having respective gradation value;
a maximum value and minimum value search section for obtaining a maximum value and a minimum value of gradation values of the predetermined number of pixels in each block obtained by the dividing section;
a discrimination section for determining whether each block of the divided blocks is a first kind block, in which an outline portion of the image is not included and a difference between the maximum value and the minimum value of the block is equal to or greater than a reference value or a second kind block other than the first kind block; and
a normalization output section which divides a distribution range of gradation values, both ends of which correspond to the maximum value and the minimum value of each block of the divided blocks, in a case where a discrimination result of the discrimination section with respect to the block is the second kind block, into N areas (where N is an integer which is equal to 2 or greater) and outputs compressed data containing code data for showing to which area in the N areas, each pixel in each block belongs, and the maximum value and the minimum value, and which divides a distribution range of gradation values, both ends of which correspond to the maximum value and the minimum value of each block of the divided blocks, in a case where a discrimination result of the discrimination section with respect to the block is the first kind block, into M areas (where M is an integer which is greater than N) and outputs compressed data containing code data for showing to which area in the M areas, each pixel in each block belongs, the maximum value and the minimum value;
wherein in a case of the first kind block, the normalization output section arranges the maximum value and the minimum value related to the block in a first order in a head portion of the compressed data, and in a case of the second kind block, the normalization output section arranges the maximum value and the minimum value related to the block in a second order that is a reverse order of the first order in a head portion of the compressed data.

2. An image compression apparatus comprising:
a dividing section for dividing an image to be compressed into blocks, each of which has a predetermined number of pixels having respective gradation value;
a maximum value and minimum value search section for obtaining a maximum value and a minimum value of gradation values of the predetermined number of pixels in each block obtained by the dividing section;
a discrimination section for determining whether each block of the divided blocks is a first kind block, in which an outline portion of the image is not included or a second kind block in which the outline portion of the image is included; and
a normalization output section which divides a distribution range of gradation values, both ends of which correspond to the maximum value and the minimum value of each block of the divided blocks, in a case where a discrimination result of the discrimination section with respect to the block is the second kind block, into N areas (where N is an integer which is equal to 2 or greater) and outputs compressed data containing code data for showing to which area in the N areas, each pixel in each block belongs, and the maximum value and the minimum value, and which divides a distribution range of gradation values, both ends of which correspond to the maximum value and the minimum value of each block of the divided blocks, in a case where a discrimination result of the discrimination section with respect to the block is the first kind block, into M areas (where M is an integer which is greater than N) and outputs compressed data containing code data for showing to which area in the M areas, each pixel in each block belongs, the maximum value and the minimum value;
wherein in a case of the first kind block, the normalization output section arranges the maximum value and the minimum value related to the block in a first order in a head portion of the compressed data, and in a case of the second kind block, the normalization output section arranges the maximum value and the minimum value related to the block in a second order that is a reverse order of the first order in a head portion of the compressed data.

3. The image compression apparatus of claim 1, wherein the discrimination section discriminates that the block does not include outer portion of the image in a case where the maximum value of the difference of gradation values of the pixels adjacent to each other in the block to be processed is not more than a default value defined beforehand.

4. The image compression apparatus of claim 1, wherein the normalization output section outputs the compressed data in a configuration of arranging the code data assigned to each pixel behind the maximum value and the minimum value arranged in one of the first and second orders.

5. The image compression apparatus of claim 1, wherein the minimum number of bits that can express M kinds is larger than the minimum number of bits that can express N kinds; code data related to the first kind block is code data of the minimum number of bits that can express N kinds; and code data related to the second kind block is code data of the minimum number of bits that can express M kinds.

6. The image compression apparatus of claim 2, wherein the discrimination section discriminates that the block does not include outer portion of the image in a case where the maximum value of the difference of gradation values of the pixels adjacent to each other in the block to be processed is not more than a default value defined beforehand.

7. The image compression apparatus of claim 2, wherein the normalization output section outputs the compressed data in a configuration of arranging the code data assigned to each pixel behind the maximum value and the minimum value arranged in one of the first and second orders.

8. The image compression apparatus of claim 2, wherein the minimum number of bits that can express M kinds is larger than the minimum number of bits that can express N kinds; code data related to the first kind block is code data of the minimum number of bits that can express N kinds; and code data related to the second kind block is code data of the minimum number of bits that can express M kinds.

9. An image compression method comprising:
dividing, by a computer, an image to be compressed into blocks, each of which has a predetermined number of pixels having respective gradation value;
obtaining, by the computer, a maximum value and a minimum value of gradation values of the predetermined number of pixels in each block obtained by the dividing section;
determining, by the computer, whether each block of the divided blocks is a first kind block, in which an outline portion of the image is not included and a difference between the maximum value and the minimum value of the block is equal to or greater than a reference value or a second kind block other than the first kind block;

dividing, by the computer, a distribution range of gradation values, both ends of which correspond to the maximum value and the minimum value of each block of the divided blocks, in a case where a discrimination result of the discrimination section with respect to the block is the second kind block, into N areas (where N is an integer which is equal to 2 or greater) and outputting compressed data containing code data for showing to which area in the N areas, each pixel in each block belongs, and the maximum value and the minimum value;

dividing, by the computer, a distribution range of gradation values, both ends of which correspond to the maximum value and the minimum value of each block of the divided blocks, in a case where a discrimination result of the discrimination section with respect to the block is the first kind block, into M areas (where M is an integer which is greater than N) and outputting compressed data containing code data for showing to which area in the M areas, each pixel in each block belongs, the maximum value and the minimum value; and in a case of the first kind block, arranging, by the computer, the maximum value and the minimum value related to the block in a first order in a head portion of the compressed data, and in a case of the second kind block, arranging, by the computer, the maximum value and the minimum value related to the block in a second order that is a reverse order of the first order in a head portion of the compressed data.

10. An image compression method comprising:

dividing, by a computer, an image to be compressed into blocks, each of which has a predetermined number of pixels having respective gradation value;

obtaining, by the computer, a maximum value and a minimum value of gradation values of the predetermined number of pixels in each block obtained by the dividing section;

determining, by the computer, whether each block of the divided blocks is a first kind block, in which an outline portion of the image is not included or a second kind block in which the outline portion of the image is included;

dividing, by the computer, a distribution range of gradation values, both ends of which correspond to the maximum value and the minimum value of each block of the divided blocks, in a case where a discrimination result of the discrimination section with respect to the block is the second kind block, into N areas (where N is an integer which is equal to 2 or greater) and outputting compressed data containing code data for showing to which area in the N areas, each pixel in each block belongs, and the maximum value and the minimum value;

dividing, by the computer, a distribution range of gradation values, both ends of which correspond to the maximum value and the minimum value of each block of the divided blocks, in a case where a discrimination result of the discrimination section with respect to the block is the first kind block, into M areas (where M is an integer which is greater than N) and outputting compressed data containing code data for showing to which area in the M areas, each pixel in each block belongs, the maximum value and the minimum value; and in a case of the first kind block, arranging the maximum value and the minimum value related to the block in a first order in a head portion of the compressed data, and in a case of the second kind block, arranging the maximum value and the minimum value related to the block in a second order that is a reverse order of the first order in a head portion of the compressed data.

* * * * *